J. C. RAMSAY.
MECHANICAL MOVEMENT.
APPLICATION FILED JAN. 3, 1911.
1,029,766.
Patented June 18, 1912.
2 SHEETS—SHEET 1.
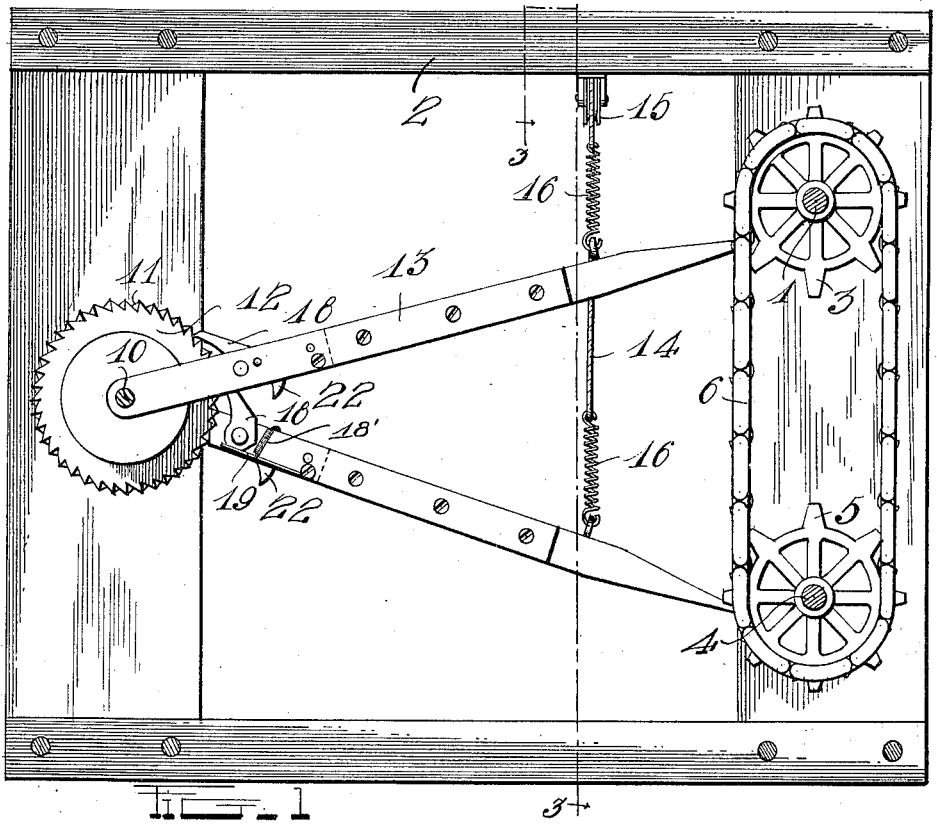
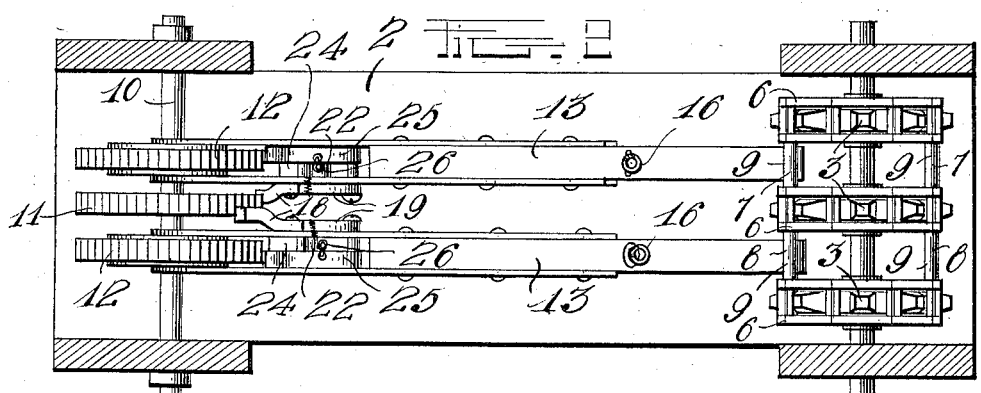
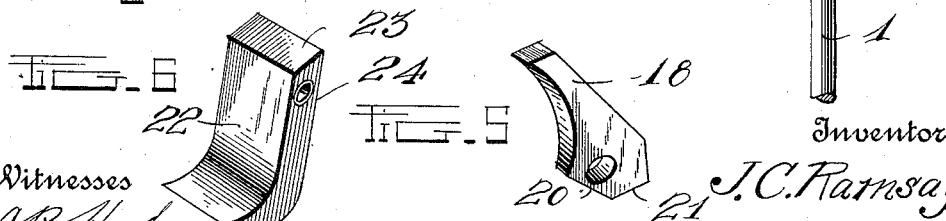
Witnesses
C. P. Hardy
O. B. Hopkins
Inventor
J. C. Ramsay
by H. B. Willson & Co.
Attorneys

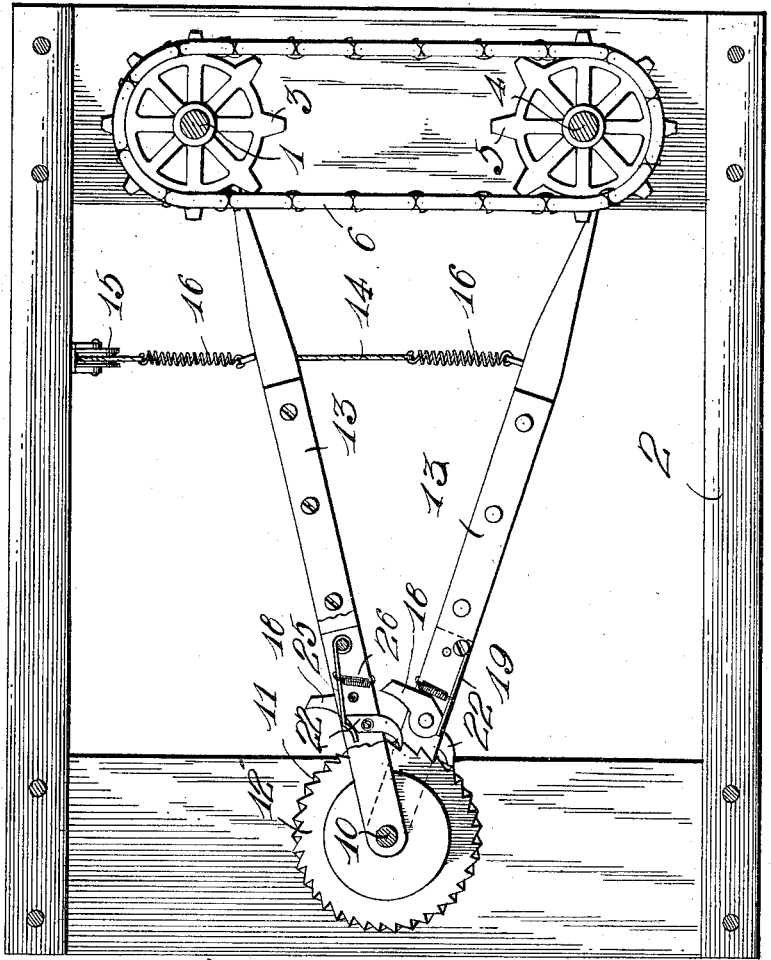
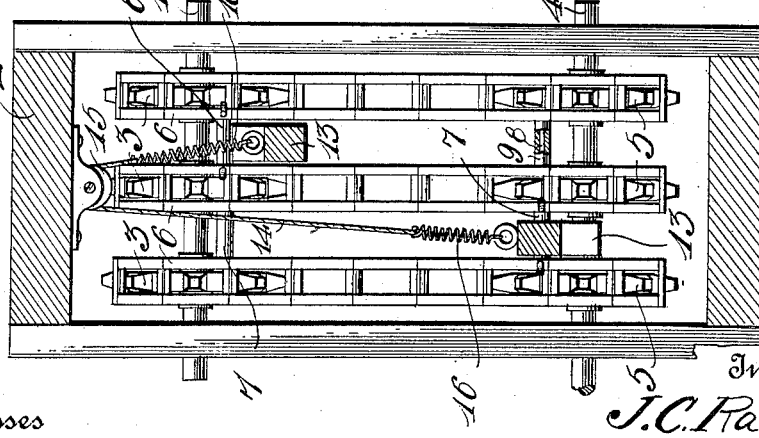

UNITED STATES PATENT OFFICE.

JOHN C. RAMSAY, OF ST. LOUIS, MISSOURI.

MECHANICAL MOVEMENT.

1,029,766.  Specification of Letters Patent.  Patented June 18, 1912.

Application filed January 3, 1911. Serial No. 600,625.

*To all whom it may concern:*

Be it known that I, JOHN C. RAMSAY, a citizen of the United States, residing at St. Louis, in the State of Missouri, have invented certain new and useful Improvements in Mechanical Movements; and I do declare the following to be a full, clear, and exact description of the invention, such as will enable others skilled in the art to which it appertains to make and use the same.

This invention relates to improvements in mechanical movements.

One object of the invention is to provide a mechanical movement for transmitting and increasing power at the same time reducing speed and in which the transmitted motion will be continuous.

Another object is to provide a power transmitting mechanism which may be readily reversed for operation in either direction.

With the foregoing and other objects in view, the invention consists of certain novel features of construction, combination and arrangement of parts as will be more fully described and particularly pointed out in the appnded claim.

In the accompanying drawings: Figure 1 is a side view of the invention with one side of the frame removed and the shafts in section; Fig. 2 is a horizontal sectional view through the supporting frame showing the top plan view of the mechanism; Fig. 3 is a vertical cross section on the line 3—3 of Fig. 1; Fig. 4 is a view similar to Fig. 1 showing the parts arranged for operation in a reverse direction to that shown in Fig. 1; Fig. 5 is a detail perspective view of one of the driving pawls for operating the device in one direction; and, Fig. 6 is a similar view of one of the pawls for operating the device in the opposite or reverse direction.

Referring more particularly to the drawings, 1 denotes the main drive or power transmitting shaft which is revolubly mounted in any suitable supporting frame 2 and which may be operated by any form of engine or motor. On the shaft 1 are fixedly mounted three sprocket gears 3. In the frame 2 below the shaft 1 is revolubly mounted a counter-shaft 4. On the shaft 4 are fixedly mounted three sprocket gears 5, said gears 5 being disposed immediately below and in line with the upper gears 3. The gears 3 and 5 are operatively connected together by sprocket chains 6. The intermediate or center chain is connected to the side chain on one side thereof by a series of trip bars 7 and to the chain on the opposite side by a series of trip bars 8. The trip bars 7 and 8 between the center and opposite side chains are spaced a suitable distance apart and the trip bars on one side are arranged opposite the center of the spaces between the trip bars of the other side. The bars 7 and 8 are provided with anti-friction sleeves or rollers 9.

Revolubly mounted in the opposite end of the frame from the sprocket gearing is a driven shaft 10 or the shaft to which the motion and power of the motor is to be transmitted. The shaft 10 may be connected in any suitable manner to the machine to be operated. On the shaft 10 is fixedly mounted a series of ratchet gears, three of which are shown in the present instance. The intermediate or center gear 11 has its teeth arranged in one direction, while the outer gears 12 have their teeth arranged in the opposite direction.

Pivotally connected at one end to the shaft 10 are two power transmitting levers 13, said levers being bifurcated at one end and having said bifurcated ends embracing the outer ratchet gears 12 and pivotally engaging the shaft 10 adjacent to the opposite sides of said gears as shown. The opposite ends of the levers are tapered on their upper and lower edges and said tapered ends are adapted to project between the center and outer side chains 6 of the sprocket gears. The tapered ends of the levers when thus projected between the chains 6 are adapted to be engaged by the trip bars 7 and 8 as the latter are brought around by the sprocket gearing.

The free or tapered ends of the levers 13 are supported in operative position to be engaged and actuated by the trip bars 7 and 8 by means of a supporting cable 14 which is slidably engaged with a supporting pulley 15 arranged in the upper portion of the frame 2 as shown. Between the opposite ends of the cable 14 and the levers 13 are arranged coiled springs 16. The springs 16 are provided to permit the levers to be moved a slight distance beyond the limit of the cable 14 which has been found to be necessary in the reverse movement of the mechanism.

Pivotally mounted on the inner sides of the bifurcated ends of the levers 13 are pawls 18 which are held in and out of operative positions by flat springs 19. The pawls are provided on their pivoted ends with square or flat spring engaging surfaces 20 and 21. When the pawls are in position to engage the teeth of the ratchet gear 11 the springs 19 will be engaged with the surfaces 20 of the pawls and will yieldingly hold the same into operative engagement with said gear 11. When the gears are swung back to an inoperative position wherein they are prevented from engaging the teeth of the gear 11 the springs 19 will engage the surfaces 21 whereby the pawls will be held in this position. The coil springs 19 are connected to the springs 18' and to the adjacent portion of the levers and serve to supplement or assist the springs 19. When the pawls are in operative position and the sprocket gearing is driven in the proper direction the trip bars 7 and 8 will be brought into successive engagement with the tapered ends of first one and then the other lever 13 thereby alternately raising or lowering or swinging the same up and down which movement will successively engage the pawls 17 with the teeth of the ratchet gear thus continuously turning the same in one direction. In order to reverse the movement or to drive the shaft 10 in the opposite direction the levers 13 are provided with reversing pawls 22 which are pivotally mounted in the bifurcated ends of the levers and are adapted to be turned into and out of position for engaging the teeth of the outer ratchet gears 12 on the shaft 10. The pawls 22 are provided on their pivoted ends with spring engaging surfaces 23 and 24 with which are engaged springs 25 arranged in the bifurcated ends of the levers as shown. When the pawls 22 are in position to engage the teeth of the ratchet gears, the springs 25 will be engaged with the surfaces 23 and when the pawls are turned to an inoperative position the springs will be engaged with the surfaces 24, said springs thus yieldingly holding the pawls in either of their positions. The springs 25 have connected thereto supplemental coiled springs 26 whereby they are assisted in holding the pawls in position. By thus arranging the pawls 17 and 22 it is simply necessary to swing the pawls 22 to an operative position to permit the shaft 10 to be driven in one direction and the pawls 17 to an inoperative position to permit the shaft to be driven in a reverse direction. If it should be desired to construct the mechanism for continuous operation in one direction the ratchet gears 12 and the reversing pawls 22 may be omitted.

By arranging the power transmitting mechanism as herein shown and described it will be readily seen that the power of the drive shaft 1 is greatly increased when applied to the shaft 10 through the levers 13 and it will also be seen that the shaft 10 may turn independently of the drive shaft 1, so that for instance if the mechanism should be applied to a motor vehicle the power may be shut off when running down hill and the machine allowed to coast or travel by its own weight.

From the foregoing description taken in connection with the accompanying drawings, the construction and operation of the invention will be readily understood without requiring a more extended explanation.

Having thus described my invention, what I claim is:

In a mechanical movement, a supporting frame, a drive shaft revolubly mounted therein, a series of sprocket gears fixedly mounted on said shaft, a counter-shaft revolubly mounted in said frame, a series of sprocket gears fixedly mounted on said counter-shaft, a series of sprocket chains to operatively connect said gears, trip bars arranged between and connected to the adjacent sides of said chains, the trip bars on one side of the sprocket gearing being arranged opposite to the spaces between the trip bars on the opposite sides of the gearing, anti-friction sleeves arranged on said trip bars, a driven shaft revolubly mounted in said frame, a series of ratchet gears fixedly mounted on said shaft, said gears comprising a center or intermediate gear having its teeth arranged in one direction and side gears having their teeth arranged in the opposite direction, power transmitting levers pivotally connected at one end with said driven shaft and having their opposite ends tapered and arranged in position to be successively engaged by the trip bars on said sprocket chains, a pulley arranged in said supporting frame, a lever supporting cable slidably engaged with said pulley, springs arranged between the ends of said cable and said levers whereby the latter are yieldably supported, pivoted pawls carried by said levers and adapted to be successively engaged with said intermediate ratchet gear, springs to hold said pawls in and out of operative positions, reversing pawls carried by said levers and adapted to engage said side ratchet gears, and springs adapted to hold said reversing pawls in and out of operative position.

In testimony whereof I have hereunto set my hand in presence of two subscribing witnesses.

JOHN C. RAMSAY.

Witnesses:
E. F. MULLINS,
L. H. CHENER.

Copies of this patent may be obtained for five cents each, by addressing the "Commissioner of Patents, Washington, D. C."